Feb. 27, 1968    G. A. HAUGH ETAL    3,370,630
PLASTIC PACKAGE
Filed March 7, 1966    2 Sheets-Sheet 1
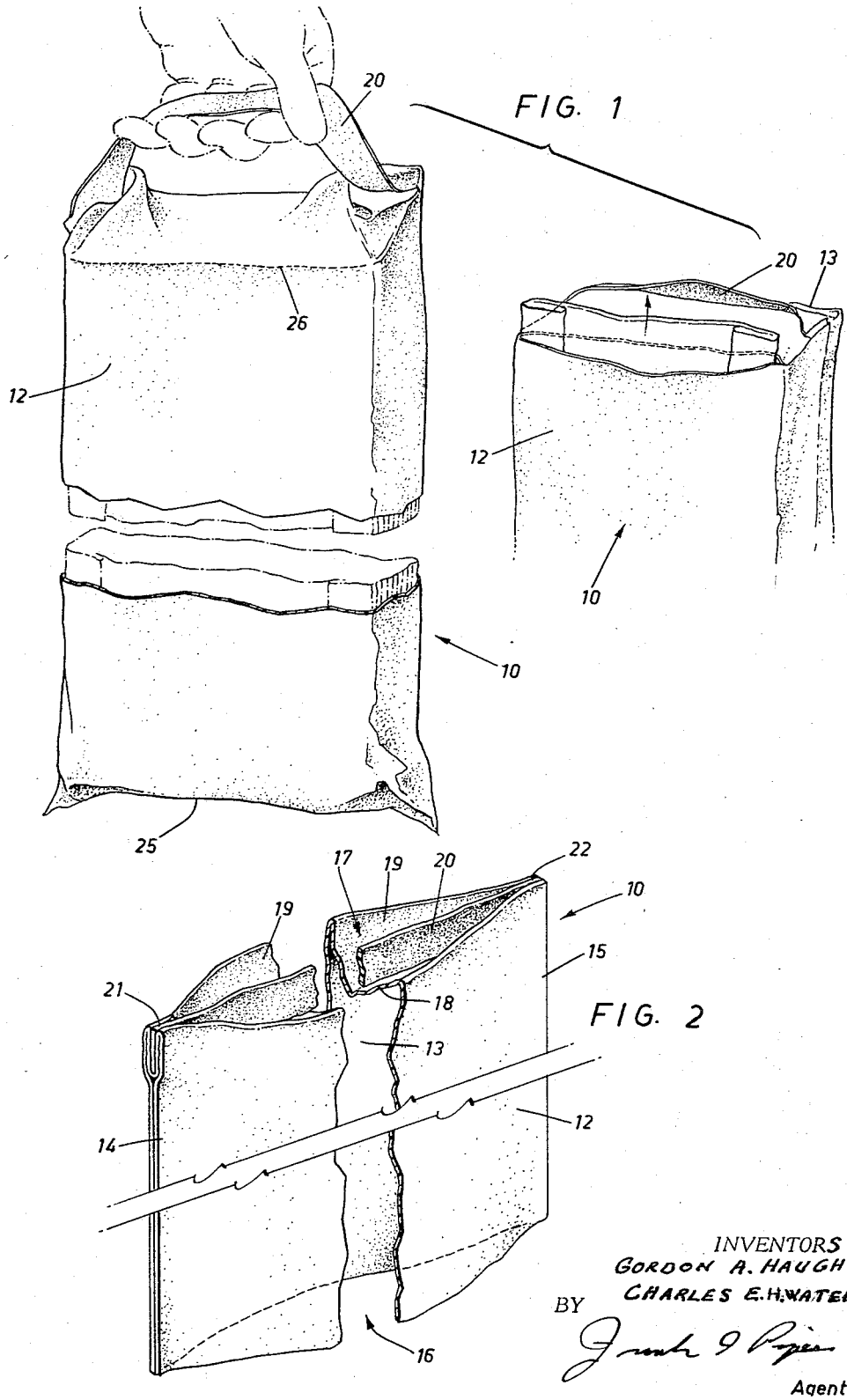
INVENTORS
GORDON A. HAUGH
CHARLES E. H. WATERS
BY
Agent Feb. 27, 1968   G. A. HAUGH ET AL   3,370,630
PLASTIC PACKAGE
Filed March 7, 1966   2 Sheets-Sheet 2

INVENTORS.
GORDON A. HAUGH
BY CHARLES E. H. WATERS

Agent

United States Patent Office 3,370,630
Patented Feb. 27, 1968

3,370,630
PLASTIC PACKAGE
Gordon Alexander Haugh, 1481 Lochlin Trail, Port Credit, Ontario, Canada, and Charles Edward Hancourt Waters, 4658 Upper Roslyn Ave., Montreal, Quebec, Canada
Filed Mar. 7, 1966, Ser. No. 532,348
Claims priority, application Canada, Aug. 28, 1965, 939,358
4 Claims. (Cl. 150—12)

ABSTRACT OF THE DISCLOSURE

A bag or package formed of heat-sealable plastic film and having a handle positioned within a gusset or pleat formed along one side of the bag. The handle, which is also formed of heat-sealable plastic film, extends the length of the pleat and is heat welded to the bag at each edge thereof.

---

This invention relates to a bag or similar container formed of plastic material. More particularly, it relates to thin-wall thermoplastic bags or the like containers having convenient handle means integrally affixed thereto and to a method of manufacturing such bags or containers.

In recent years packaging has become an extremely important aspect of retail merchandising. Packages formed of thermoplastic film or sheet material offer many advantages to manufacturers and merchandisers and the use of these materials has increased tremendously in recent years with the growth of the self-serve mechandising industry. The problem of an inexpensive handle for containers or bags formed of plastic material has long been a puzzling one to packaging manufacturers. It has been customary to provide handles of cardboard, moulded plastic or other suitable material which are stapled, glued or heat welded to the bag adjacent the opening thereof. However, these products are not entirely satisfactory for all purposes and, in particular, are often impractical or prohibitively expensive for packaging of high volume, low priced articles such as frozen foods, paper napkins, disposable diapers and the like.

It is the general object of the present invention to provide a low-cost, thin-walled plastic bag or container having a convenient carrying handle integrally affixed thereto.

Another object of the invention is to provide an inexpensive thin-walled plastic bag having an attached handle which permits easy, convenient handling or carrying of packaged articles and also facilitates emptying of the bag or dispensing articles therefrom.

It is another object of this invention to provide a bag or container with sheet-like walls formed of thermoplastic film, the bag having an opening at one end adapted to receive articles to be packaged and a gusset at the opposite end with a handle positioned therein and heat welded thereto at its opposite ends.

It is another object of this invention to provide a simple, inexpensive method for producing thin-walled plastic bags or containers having a convenient carrying handle or strap heat welded thereto.

A still further object of this invention is to provide a method for continuously forming thermoplastic bags and attached plastic handles from thin thermoplastic film.

These objects are accomplished by the present invention wherein there is provided a bag or like container having a rectangular body formed of heat sealable plastic film and having a gusset formed along one edge and an opening formed along another edge, a handle formed of a heat sealable plastic strip disposed within said gusset, said handle extending substantially the length of said gusset and secured at each end therein. Preferably, the front and back wall sections are formed of a single sheet of film joined at one end along a fold-line and having mated side edges heat sealed together. A gusset is formed along the folded end and positioned within the gusset is a transverse handle member formed of plastic film or sheet and having its outer extremities heat welded between the sidewall sections at the side edges thereof.

The bag of this invention, in its unfilled condition, is flat, open along one end, and closed along the opposite end and two sides. The handle strip is positioned between the pleats forming the gusset and lies in the same plane as the side walls of the bag. The bag is filled through the open end, which is then heat sealed to provide a substantially air-tight package. In its filled condition, the gussetted end of the bag is pushed outwardly together with the handle strip which twists such that its minor width is generally normal to the side walls. In this position, the handle is easily gripped for carrying or otherwise handling the package.

According to the method of the present invention, there is provided an elongated tube of plastic film which is joined along a longitudinal fold-line on one edge and open along the opposite edge, a gusset is formed along the folded edge, a relatively narrow elongated strip of thermoplastic material is positioned within the gusset adjacent the fold-line. Transverse heat welds are affected at spaced intervals along the length of the tube whereby compartments with sealed side edges are formed and the strip within the gusset is heat welded between said side edges. The film is cut along the centre line of the transverse heat welds to provide individual bags. The method permits the simultaneous forming of the bag and affixed handle member in an extremely simple operation, the attractive economies of which will be self-evident.

The invention will be understood from the following detailed description made with reference to the accompanying drawings in which:

FIGURE 1 is a perspective view, partly broken away, of a bag in accordance with the invention containing packaged articles;

FIGURE 2 is a perspective view, partly broken away, of a preferred embodiment of the invention showing the position of the handle in the unfilled bag.

Figure 3:
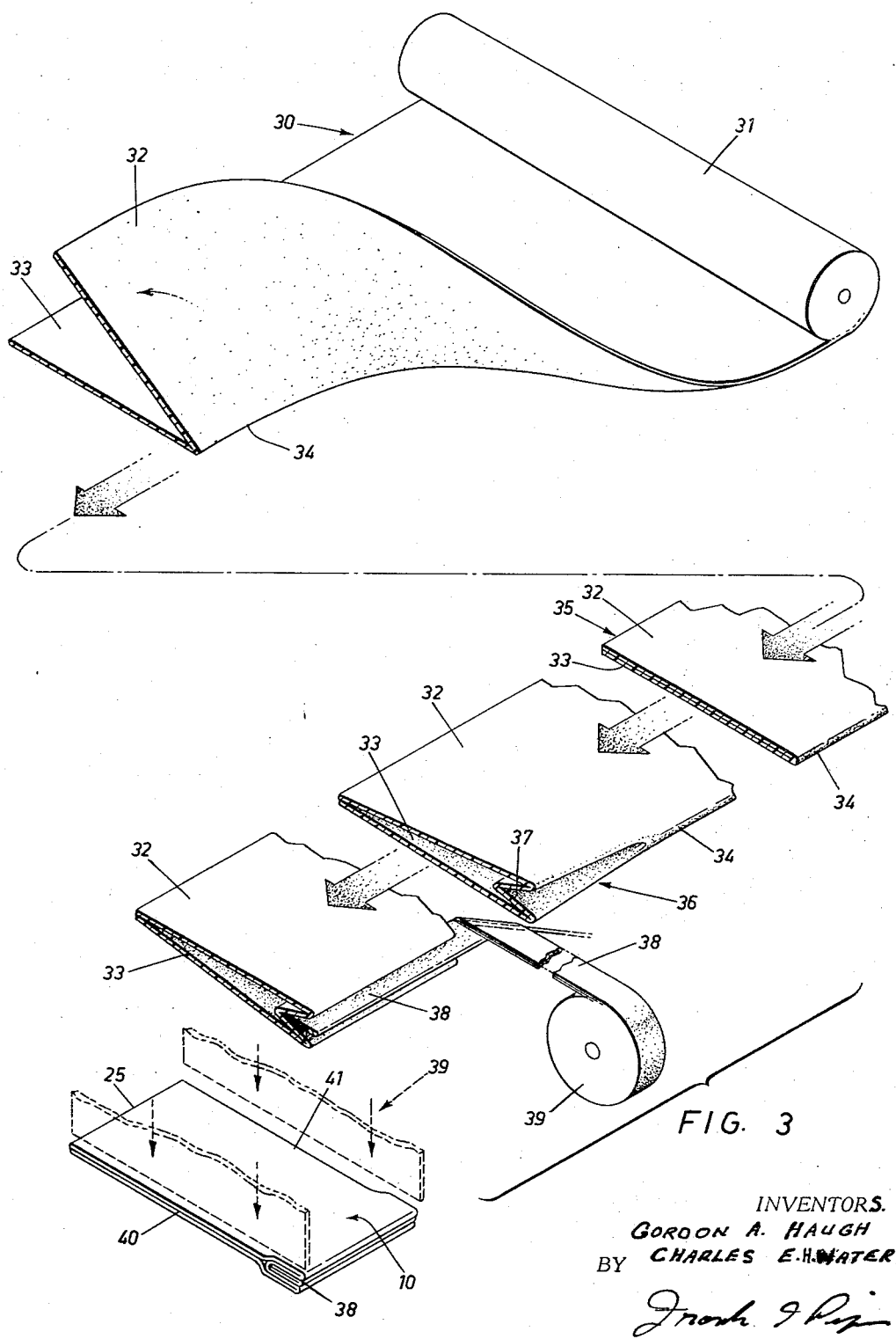
FIGURE 3 is a schematic illustration of the method of the invention.

Referring now to the drawings, the numeral 10 designates the body portion of the bag or container which preferably is made of polyethylene, vinylite, polyester, polypropylene, some other heat sealable thermoplastic film, or non-thermoplastic films treated to render them heat sealable. Body 10 has front and back sidewalls 12 and 13 respectively which are heat sealed along side edges 14, 15. At one end, walls 12, 13 define opening 16, as shown in FIGURE 2. On the end opposite opening 16, sidewalls 12, 13 are contiguous and are pleated or folded inwardly along the fold-line to form a gusset 17 defined by inwardly folded sidewall portions 18, 19. The depth of gusset 17 is a matter of choice depending on the overall dimensions of the bag and the type of product for which it is intended. Positioned in gusset 17 is handle member 20. Handle 20 is formed of a strip of heat-weldable thermoplastic material and has outer extremities 21, 22 heat-sealed between the two sidewall portions 18, 19 at edges 14, 15 respectively. In the embodiment illustrated in FIGURES 1 and 2, handle 20 is a flat strip having a width about equal to the depth of gusset 17. Since like materials are more amenable to heat welding, handle 20 preferably is formed of a strip of thermoplastic sheet material of the same composition as that employed for the body portion 10 of the bag. However, handle member 20 may be formed of different material than that of body 10, may have any other suitable configuration and may also be formed of a single relatively thick plastic strip or bi-folded strip or tube.

In use, the bags of this invention are filled through opening 16 and the free edges heat welded to form closed bottom edge 25 as shown in FIGURE 1. Thus, the closed bag provides a completely sealed container which can be air-tight and moisture-proof if desired. The bag may be opened by the purchaser by cutting the film by means of a sharp instrument at any convenient point; or as shown in the embodiment shown in FIGURE 1 by means of a series of perforations 26 provided across the gussetted end of the body 10. The latter method permits easy, orderly removal of the contents, which in the illustration are folded disposable diapers, by simply sliting along the line of perforations. Also, the position of handle 20 and perforations 26 facilitate the removal of articles from the package and permits its use as a dispenser as well as a container for the articles.

A preferred method of this invention by which the bags or containers described hereinabove are produced is illustrated schematically in FIGURE 3. Thermoplastic film 30, fed from a roll 31 or other suitable source of supply, is folded once along its longitudinal centre line to provide two opposed, co-extensive sheets 32, 33 joined along fold-line 34. The folded film 35 is pleated inwardly as shown at 36 along fold-line 34 to form gusset 37. A relatively narrow strip 38, fed from supply source 39, is positioned within gusset 37. The folded, gussetted sheet with strip 38 within gusset 37 is fed to heat welding and cutting steps indicated generally at 39 where sides 32, 33 and strip 38 are transversely heat-sealed together at predetermined intervals along their length to form heat welds 40, 41. Individual bags are separated from the continuous length of film by cutting along the centre line of the transverse welds 40, 41 either concurrently with the welding step or in a separate step.

It will be understood that modifications may be made in the illustrated method without departing from the scope of the invention. For example, it is not necesary that sidewall sheets 32, 33 be provided by longitudinally folding a wider film. It may be preferable in some cases, such as where it is not possible or practical to print on film of the width required, to utilize two narrower strips of film and to heat join them along fold-line 34 either before or during the gusset forming step 36. Also, pre-gussetted tubing open on one longitudinal edge could be utilized. The only steps required to complete the bag in accordance with the method of the invention would then be the insertion of the handle strip 38 and the heat welding and cutting or shearing.

Another modification is to utilize a continuous tube of film which is closed along both longitudinal edges. The gusset is formed along one or both longitudinal edges and the handle strip placed therein in the manner described hereinabove. Transverse heat welds are effected across the tube at spaced intervals therealong. The tube is then transversely cut at spaced intervals along its length to produce separate bags which are open on one side edge, heat sealed on the opposite edge and closed at the two ends.

Still another modification within the ambit of the invention are the utilization of specially coloured or shaped strip material 38 for the handle and the heat welding of the handle on the bias to provide a more evenly distributed pull on the handle at the point of attachment to the sidewalls. This latter procedure may be desirable where the bag is used to package relatively heavy articles.

The invention also contemplates bags in which the opening through which the bag is filled is along one of the edges 14 or 15 and both ends of the bag are closed. In this case, the bag can have gussets at both ends and handle strips secured in one or both gussets. This embodiment does not have as many advantages as that illustrated in FIGURES 1 and 2 but, nonethless, it may be preferable in some specialized applications.

Other variations and modifications will occur to those ordinarily skilled in the art, and it is intended that such should be included within the appended claims.

What we claim as new and desire to protect by Letters Patent of the United States is:

1. A bag of the character described comprising a body portion formed of heat sealable plastic film defining an inner compartment, said body portion having an edge folded inwardly to define a gusset therealong and another edge formed with an opening communicating with said inner compartment, a handle formed of a strip of heat sealable plastic film disposed within said gusset, said handle extending substantially the length of said gusset and secured in the gusset at each end thereof.

2. A bag of the class described comprising front and back wall sections formed of thermoplastic film defining a compartment having an open mouth and a closed bottom opposite said mouth, a gusset formed along said bottom, handle means positioned within said gusset, said handle means comprising a strip extending substantially the length of said gusset and having opposite extremities heat sealed therein.

3. A bag as claimed in claim 1 including a row of perforations across one sidewall adjacent to and parallel to the edge having the gusset formed therealong, said perforations adapted to provide access to the interior of said bag by slitting therealong.

4. A bag as claimed in claim 1, in which said handle means comprises a bi-folded strip of thermoplastic film of the same composition as the film comprising the front and back wall sections of said bag.

References Cited

UNITED STATES PATENTS 3,240,420  3/1966  Membrino _____ 229—54

FOREIGN PATENTS 1,363,090  4/1964  France.

DAVID M. BOCKENEK, *Primary Examiner.*